United States Patent Office 2,793,115
Patented May 21, 1957

2,793,115
BRAZING ALLOYS

Nikolajs Bredzs and Domenic A. Canonico, Chicago, Ill., assignors, by mesne assignments, to Lithium Corporation of America, Inc., Minneapolis, Minn., a corporation of Minnesota No Drawing. Application January 17, 1955,
Serial No. 482,428

12 Claims. (Cl. 75—173)

Our invention relates to improvements in the brazing of metals and is especially concerned with the production of new and useful self-fluxing, air-proof brazing alloys and to the use of such alloys in the brazing of metals, particularly steels.

In the brazing of metals, it is essential, for effective results, that the brazing metal, which, at the temperature at which the brazing operation is conducted, is in a liquid or molten state, wet the surface of the solid metal which is to be brazed with the brazing metal. The presence of metal oxides at the interface between the solid metal to be brazed and the molten brazing metal prevents the desired wetting action. When the brazing operation is carried out in a reducing atmosphere, various of the oxides which would normally form at the elevated temperatures involved are prevented from forming and any which do form, other than those of particularly stable character, are promptly reduced. Hence, as is well known, dry reducing or inert atmospheres tend to maintain the conditions conductive to wetting and generally bring about desirable brazing results.

In many brazing operations, however, the procedure, including the heating step, from a practical standpoint, must be carried out in air or in the open atmosphere and, hence, it is common practice to utilize fluxes to remove the metal oxides which inevitably form, the fluxes functioning essentially as oxide removers and oxygen barriers. Conventional brazing fluxes comprise metallic salts which are solid at normal temperatures and which must be melted in contact with the work or solid metal to be brazed before they are effective to bring about their intended removal of metal oxides. In other words, for best results, the flux used must be molten and active before the brazing metal bonds to the work. A satisfactory flux must also be of such character as to form a continuous, unbroken film over the joint area; even when loaded with dissolved and suspended oxides it must have a viscosity sufficiently low to assure its physical displacement by the molten brazing metal from the narrow capillary gaps of the joint; it should be easily removable from the brazed work and, if not completely removed or removable, the residue should not be of such character as to cause eventual corrosion as, for instance, by hydrolysis. It is also known that the lower the temperature at which the brazing operation can be conducted the less will be the amount of oxidation of the work before said brazing operation is completed. Since flux mixtures of very low melting point are relatively unstable at higher temperatures, some compromise is necessary. For practical purposes, a flux should be molten and active at a temperature about 90 degrees F. below the temperature at which the brazing metal starts to melt and, in addition, the flux should be stable up to the maximum temperature required during the brazing operation. So far as we are aware, none of the brazing fluxes which are in use or which have been suggested for use fully satisfies the aforementioned requirements.

In an effort to meet the problems in brazing and to eliminate the necessity for the use of either reducing atmospheres or the use of fluxes, the employment of certain self-fluxing brazing alloys has been proposed, such alloys containing constituents capable of reducing the metal oxides normally formed in the brazing operation. In this connection, it has heretofore been known to produce self-fluxing silver base alloys containing a small percentage of lithium, generally about 1% to about 2%. Such self-fluxing alloys can be used with reasonably good results if the brazing operation is carried out in an inert atmosphere as, for example, helium or nitrogen, or in an oxyacetylene torch brazing atmosphere, for the brazing of such metals as plain carbon steels, alloy steels, stainless steels, and various other metals; or, in the case of titanium, a helium atmosphere. Such silver-base self-fluxing brazing alloys possess the marked disadvantage, however, of requiring special atmospheres, such as dry inert atmospheres, in which the brazing operation is to be carried out. Even very small proportions of oxygen or moisture in the inert atmosphere cause oxidation of the lithium and the joints brazed by such alloys become contaminated by lithium oxide.

We have discovered that the addition of small proportions of nickel to silver-base lithium containing self-fluxing brazing alloys renders such brazing alloys "air-proof" and enables their effective use without any fluxes, reducing atmospheres or even inert atmospheres. The inclusion of nickel, in the amounts hereafter stated, appears to protect the lithium against oxidation, forming a protective layer which prevents excessive oxidation of the lithium and preventing air from forming oxides on the metal being brazed.

The nickel content of our novel silver-base lithium containing self-fluxing, "air-proof" brazing alloys should be in excess of that amount which dissolves in the silver or silver-lithium alloy. At the melting point of silver, about 0.25% nickel dissolves therein. We employ an amount in excess thereof, the excess being dispersed through the ingot or the like. In general, the nickel content, based on the weight of the alloy as a whole, is from about 0.3%, and more advantageously from 0.5% or 0.75%, up to about 2% and better still up to about 1.5%. A particularly preferred range of nickel content is from about 0.9% to about 1.25%. The nickel is added in powder form, as hereafter described, the excess or undissolved nickel powder being dispersed in the form of small inclusions of metallic nickel.

The lithium content of our brazing alloys may range from about 0.1% to about 2%, more particularly in the range of about 0.5% to about 1.5%, and especially from 0.75% to 1.25%.

The following examples are illustrative of typical self-fluxing, "air-proof" brazing alloys falling within the scope of our invention. It will be understood that others may readily be prepared in the light of the guiding principles and disclosures provided herein.

| | Percent Li | Percent Ni | Balance consisting essentially of Ag |
|---|---|---|---|
| Example 1 | 1 | 1 | 98 |
| Example 2 | 0.5 | 1 | 98.5 |
| Example 3 | 0.7 | 0.9 | 98.4 |
| Example 4 | 1.2 | 1.2 | 97.6 |
| Example 5 | 0.8 | 1 | 98.2 |
| Example 6 | 1.3 | 1 | 97.7 |
| Example 7 | 1.1 | 0.9 | 98 |

A suitable method for the preparation of the brazing alloys of our invention comprises heating degasified pure silver to a temperature of 15 to 20 degrees C. above its melting point in a recrystallized alumina crucible under a dry helium atmosphere and stirring thereinto the nickel powder which is preferably of a particle size to pass a mesh of 100 to 400, especially 300 or 325 to 350. The resulting alloys, after solidifying, are then cold rolled to thin strip form, of a thickness of the order of common metal foils. The said strips are remelted in a recrystallized alumina crucible in a dry helium atmosphere and lithium in chip form is added thereto. This remelting may be repeated one or more times if necessary in order to obtain a homogeneous ingot. The latter is then cold rolled to produce a thin brazing foil.

In use, for instance, in the brazing of steels of various types, such as carbon steels, alloy steels, and stainless steels, and such metals as titanium, in appropriate inert atmospheres, reducing atmospheres, or in air, as the case may be, the brazing alloys of our invention quickly reduce the oxides on the steel or other metal surfaces. To the extent that small amounts of lithium oxide (as well as lithium chromates, silicates and other compounds) may be formed and be included in the joints from the brazing of the steels and the like, they appear to be insufficient in amounts to have any significant influence on the strength of the brazed joint. Thus, for instance, when low carbon steel was brazed with a typical one of our brazing alloys, namely, one analyzing about 1% Li, 1% Ni, 98% Ag, in an induction heating unit in air without any flux, brazed joints were obtained possessing a tensile strength of 23,000 p. s. i. by a joint thickness of 0.011 inch. Strong sound joints, with a sheer strength of 12,000 p. s. i., were obtained by brazing stainless steel sheets through oxy-acetylene torch brazing.

While air-proofing characteristics are most advantageously imparted to the self-fluxing, silver-base lithium containing brazing alloys by the addition of nickel, as disclosed above, we may also achieve such results at least to some extent by providing a thin sheath or coating of nickel on a base of the silver-lithium alloy. This is conveniently done, for instance, by electroplating the silver lithium alloy with nickel, the thickness of the nickel coating being so adjusted that, in use, when the brazing alloy is melted nickel will be present in the molten brazing alloy in the aforementioned amounts and in such proportions that a portion thereof will be dissolved and a portion will be undissolved and dispersed in the form of small particles.

What we claim as new and desire to protect by Letters Patent of the United States is:

1. A new and improved self-fluxing, air-proof brazing alloy containing from about 0.1% to about 2% lithium, from about 0.3% to about 2% nickel, a part of said nickel being dispersed in said alloy in the form of finely divided particles of metallic nickel, and the balance consisting essentially of silver.

2. A new and improved self-fluxing, air-proof brazing alloy containing from about 0.5% to about 1.5% lithium, from about 0.5% to about 1.5% nickel, a part of said nickel being dispersed in said alloy in the form of finely divided particles of metallic nickel, and the balance consisting essentially of silver.

3. A new and improved self-fluxing, air-proof brazing alloy containing about 1% lithium, about 1% nickel, a part of said nickel being dispersed in said alloy in the form of finely divided particles of metallic nickel, and the balance consisting essentially of silver.

4. A new and improved self-fluxing, air-proof silver base brazing alloy containing from about 0.1% to about 2% lithium, balance consisting essentially of silver, said alloy carrying a coating thereon of nickel of a thickness such that, when said alloy is melted in a brazing operation, the nickel content of said molten brazing alloy will fall into the range of about 0.3% to about 2%, a portion of said nickel being dissolved and a portion of said nickel being dispersed in the form of small particles.

5. A new and improved self-fluxing, air-proof silver base brazing alloy containing from about 0.5% to about 1.5% lithium, balance consisting essentially of silver, said alloy carrying a coating thereon of nickel of a thickness such that when said alloy is melted in a brazing operation, the nickel content of said molten brazing alloy will fall into the range of about 0.5% to about 1.5%, a portion of said nickel being dissolved and a portion of said nickel being dispersed in the form of small particles.

6. A new and improved self-fluxing, air-proof silver base brazing alloy containing about 1% lithium, balance consisting essentially of silver, said alloy carrying a coating thereon of nickel of a thickness such that when said alloy is melted in a brazing operation, the nickel content of said molten brazing alloy will be about 1%, a portion of said nickel being dissolved and a portion of said nickel being dispersed in the form of small particles.

7. In a method of brazing metals, the step which comprises carrying out the brazing operation with a self-fluxing, air-proof alloy containing from about 0.1% to about 2% lithium, from about 0.3% to about 2% nickel, a part of said nickel being dispersed in said alloy in the form of finely divided particles of metallic nickel, and the balance consisting essentially of silver.

8. In a method of brazing metals, the step which comprises carrying out the brazing operation with a self-fluxing, air-proof alloy containing from about 0.5% to about 1.5% lithium, from about 0.5% to about 1.5% nickel, a part of said nickel being dispersed in said alloy in the form of finely divided particles of metallic nickel, and the balance consisting essentially of silver.

9. In a method of brazing steels, the step which comprises carrying out the brazing operation with a self-fluxing, air-proof alloy containing from about 0.5% to about 2% lithium, from about 0.3% to about 2% nickel, a part of said nickel being dispersed in said alloy in the form of finely divided particles of metallic nickel, and the balance consisting essentially of silver.

10. In a method of brazing metals, the step which comprises carrying out the brazing operation with a self-fluxing, air-proof silver base brazing alloy containing from about 0.1% to about 2% lithium, balance consisting essentially of silver, said alloy carrying a coating thereon of nickel of a thickness such that when said alloy is melted in a brazing operation, the nickel content of said molten brazing alloy will fall into the range of about 0.3% to about 2%, a portion of said nickel being dissolved and a portion of said nickel being dispersed in the form of small particles.

11. In a method of brazing steels, the step which comprises carrying out the brazing operation with a self-fluxing, air-proof silver base brazing alloy containing from about 0.5% to about 1.5% lithium, balance consisting essentially of silver, said alloy carrying a coating thereon of nickel of a thickness such that when said alloy is melted in a brazing operation, the nickel content of said molten brazing alloy will fall into the range of about 0.5% to about 1.5%, a portion of said nickel being dissolved and a portion of said nickel being dispersed in the form of small particles.

12. In a method of brazing steels, the step which comprises carrying out the brazing operation with a self-fluxing, air-proof silver base brazing alloy containing about 1% lithium, balance consisting essentially of silver, said alloy carrying a coating thereon of nickel of a thickness such that when said alloy is melted in a brazing operation, the nickel content of said molten brazing alloy will be about 1%, a portion of said nickel being dissolved and a portion of said nickel being dispersed in the form of small particles.

References Cited in the file of this patent

UNITED STATES PATENTS

| | | |
|---|---|---|
| 2,196,302 | Hensel et al. | Apr. 9, 1940 |
| 2,196,306 | Hensel et al. | Apr. 9, 1940 |
| 2,362,893 | Durst | Nov. 14, 1944 |

FOREIGN PATENTS

| | | |
|---|---|---|
| 657,123 | Great Britain | Sept. 12, 1951 |
| 676,291 | Great Britain | July 23, 1952 |

OTHER REFERENCES

Addicks: "Silver in Industry," New York: Reinhold, 1940, pages 96 and 97.